(12) United States Patent
Vandine

(10) Patent No.: US 8,490,763 B2
(45) Date of Patent: Jul. 23, 2013

(54) DELAY RETURN GAS SPRING

(75) Inventor: Jason L. Vandine, Redford, MI (US)

(73) Assignee: DADCO, Inc., Plymouth, MI (US)

( * ) Notice: Subject to any disclaimer, the term of this patent is extended or adjusted under 35 U.S.C. 154(b) by 390 days.

(21) Appl. No.: 12/401,369

(22) Filed: Mar. 10, 2009

(65) Prior Publication Data

US 2010/0230875 A1 Sep. 16, 2010

(51) Int. Cl.
*F16F 9/34* (2006.01)

(52) U.S. Cl.
USPC ............... 188/322.15; 188/322.16; 267/119; 267/129

(58) Field of Classification Search
USPC ............ 188/322.15, 322.16, 322.18, 322.22, 188/282.1, 282.3, 282.4, 283; 267/64.11, 267/64.28, 119, 124, 129, 130, 137
See application file for complete search history.

(56) References Cited

U.S. PATENT DOCUMENTS

| 2,595,426 | A | * | 5/1952 | Thornhill | 267/64.15 |
| 3,976,287 | A | * | 8/1976 | Kendall et al. | 267/139 |
| 6,170,809 | B1 | | 1/2001 | Cotter | |
| 6,491,143 | B1 | | 12/2002 | Stenquist | |
| 7,331,570 | B2 | | 2/2008 | Stenquist | |

* cited by examiner

*Primary Examiner* — Xuan Lan Nguyen

(74) *Attorney, Agent, or Firm* — Reising Ethington P.C.

(57) ABSTRACT

A delay return gas spring including a piston at least partially received in a cylinder for reciprocation between extended and compressed positions over a cycle including a compression stroke and a return stroke. A seal disposed between the cylinder and the piston separates a primary chamber on one side of the seal from a secondary chamber on another side of the seal during a portion of the cycle. A passage communicates with the secondary chamber and with the primary chamber. The seal is relatively movable between an open position permitting free flow of gas through the passage to a closed position at least partially restricting gas flow through the passage so as to permit gas in the secondary chamber to be compressed in response to movement of the piston toward its extended position, thereby reducing a net return force on the piston and decreasing a velocity of the piston.

43 Claims, 7 Drawing Sheets

DELAY RETURN GAS SPRING

TECHNICAL FIELD

This disclosure relates generally to gas springs, and more particularly to a gas spring with a delayed return stroke.

BACKGROUND

Gas springs are well known and have been used in dies of presses for sheet metal stamping operations. Conventional gas springs include a cylinder, a piston disposed in the cylinder, a pressure chamber between the piston and cylinder, and various retainers and seals disposed in the cylinder to retain the piston and prevent leakage of pressurized gas from the pressure chamber. The pressurized gas provides a force on the piston to bias the piston toward an extended position and resists retraction of the piston from its extended position toward a compressed position.

As shown in prior art FIG. 14, typical gas springs are designed to produce a net force cycle C' as a function of piston travel. The cycle C' starts at a relatively high force, gradually increases over a compression stroke P' and gradually decreases over an extension or return stroke R', and ends substantially at the initial relatively high force. But as shown in prior art FIG. 15, other gas spring designs have been modified to produce a modified net force cycle C''. The cycle C'' starts at zero, then increases rapidly over an initial portion I'' of a compression stroke P''', thereafter follows conventional paths for the compression stroke P''' and a return stroke R''', but decreases rapidly over a final portion F''' of the return stroke similar to the initial portion I'' of the compression stroke P''', and ends at zero. According to accepted wisdom in the art for achieving such functionality, those of ordinary skill routinely resort to use of electromechanical controls, check valves in the pistons, and/or separate hydraulic and pressure chambers with one or more delay valves.

SUMMARY

A delay return gas spring according to an exemplary implementation includes a cylinder and a piston at least partially received in the cylinder for reciprocation between extended and compressed positions over a cycle including a compression stroke and a return stroke. A seal is disposed between the cylinder and the piston and, during a portion of the cycle, separating a primary chamber defined by the cylinder and the piston on one side of the seal from a secondary chamber defined by the cylinder and the piston on another side of the seal. At least one passage communicates at one end with the secondary chamber and at an other end with the primary chamber. The seal is relatively movable between an open position permitting free flow of gas through the at least one passage to a closed position at least partially restricting gas flow through the at least one passage so as to permit gas in the secondary chamber to be compressed in response to movement of the piston toward its extended position, thereby reducing a net return force on the piston and decreasing a velocity of the piston.

A gas spring according to another exemplary implementation includes a cylinder, a piston received at least partially in the cylinder for reciprocation between extended and compressed positions and to define a primary chamber between one portion of the piston and the cylinder and to further define a secondary chamber between another portion of the piston and the cylinder. The piston includes a transfer passage in fluid communication between the primary and secondary chambers during at least a portion of the reciprocation of the piston, and a movable seal constructed and arranged to pass over the transfer passage to permit and at least substantially restrict fluid flow through the transfer passage between the primary and secondary chambers during at least a portion of the reciprocation of the piston.

A gas spring according to a further exemplary implementation includes a cylinder and a piston assembly carried by the cylinder for reciprocation between extended and compressed positions. The cylinder includes a casing having an inner surface, and a piston retainer received at least partly in the casing and including a retainer body having a through bore, an outer surface with a portion disposed generally adjacent to the inner surface of the casing, and a skirt portion. The piston includes a piston rod received at least partially in the through bore of the retainer body of the piston retainer, and a piston collar carried by the piston rod, and received within the skirt portion of the retainer body of the piston retainer during at least a portion of the reciprocation of the piston. The piston collar includes radially extending axial walls, a groove between the axial walls, a common passage, a throttling port in fluid communication with the common passage, and a bleed port in fluid communication with the common passage. The piston further includes a piston rod seal disposed between the piston rod and the piston collar, and a movable seal disposed in the groove of the piston collar and constructed and arranged for contact with the skirt portion of the retainer body of the piston retainer during at least a portion of the reciprocation of the piston. In the gas spring, a primary chamber is defined by the casing and a portion of the piston on one side of the movable seal when the movable seal is in contact with the cylinder, and a secondary chamber is defined by another portion of the piston and the piston retainer between the piston rod seal and the movable seal when the movable seal is in contact with the cylinder. The movable seal is constructed and arranged to pass over the bleed port to permit and prevent fluid flow through the bleed port between the primary and secondary chambers during at least a portion of the reciprocation of the piston.

BRIEF DESCRIPTION OF THE DRAWINGS

The following detailed description of exemplary embodiments and best mode will be set forth with reference to the accompanying drawings, in which.

DETAILED DESCRIPTION OF THE EXEMPLARY EMBODIMENTS

Figures 11, 12, 13:
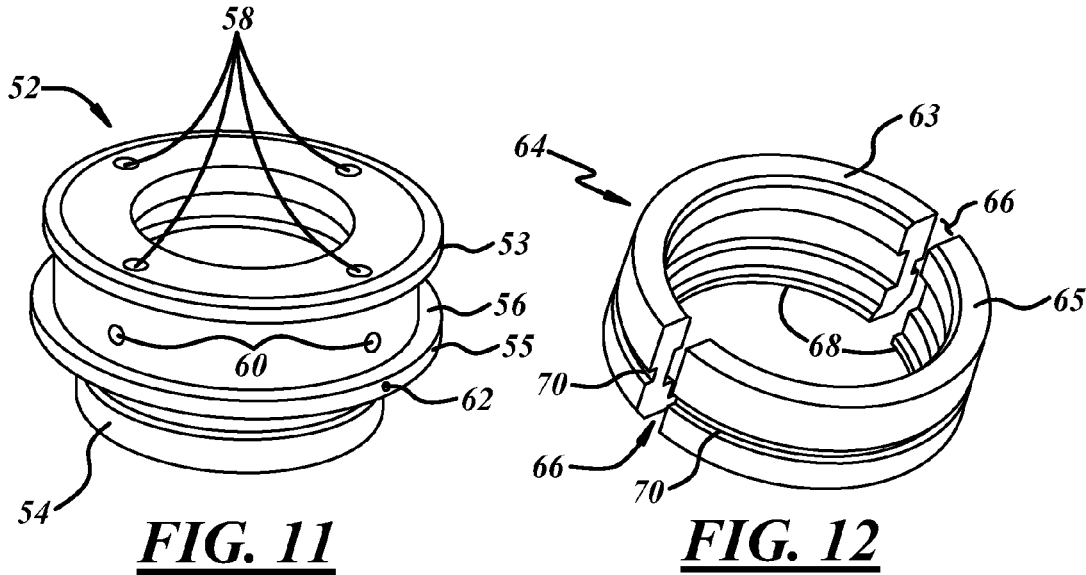
FIG. 11 is a perspective view of a collar of the piston of FIG. 1.
FIG. 12 is a perspective view of a retainer of the piston of FIG. 1.
FIG. 13 is a graphical plot of Force as a function of Travel of a piston of an exemplary gas spring.
Figure 14:
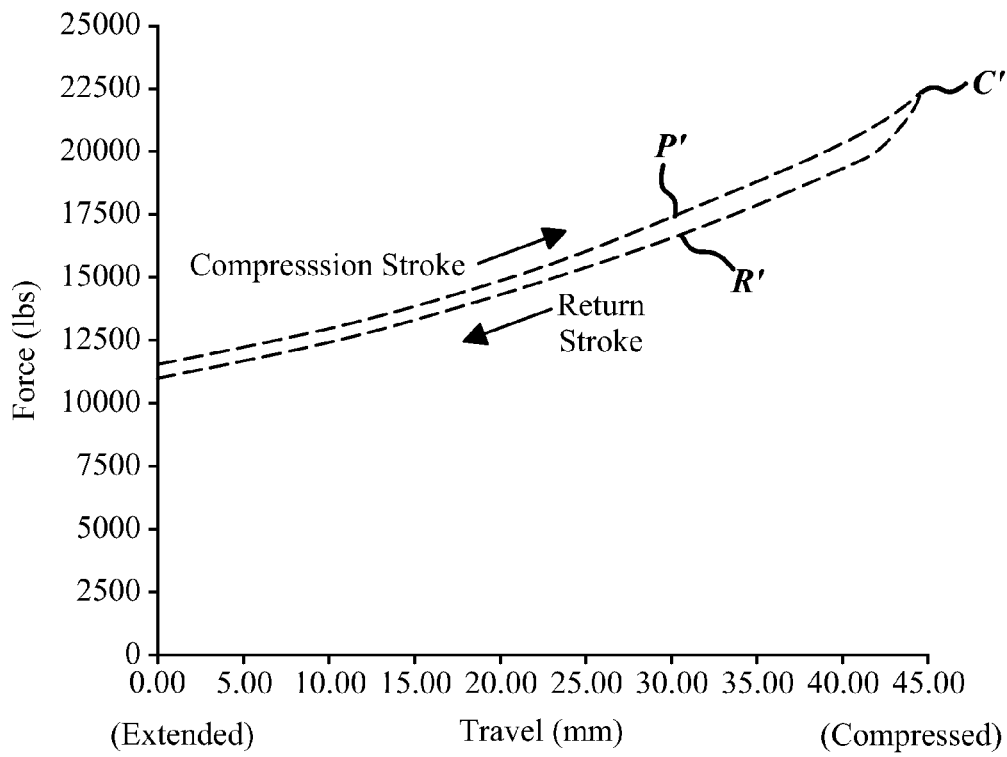
FIG. 14 is a graphical plot of Force as a function of Travel of a prior art piston of a prior art gas spring.
Figure 15:
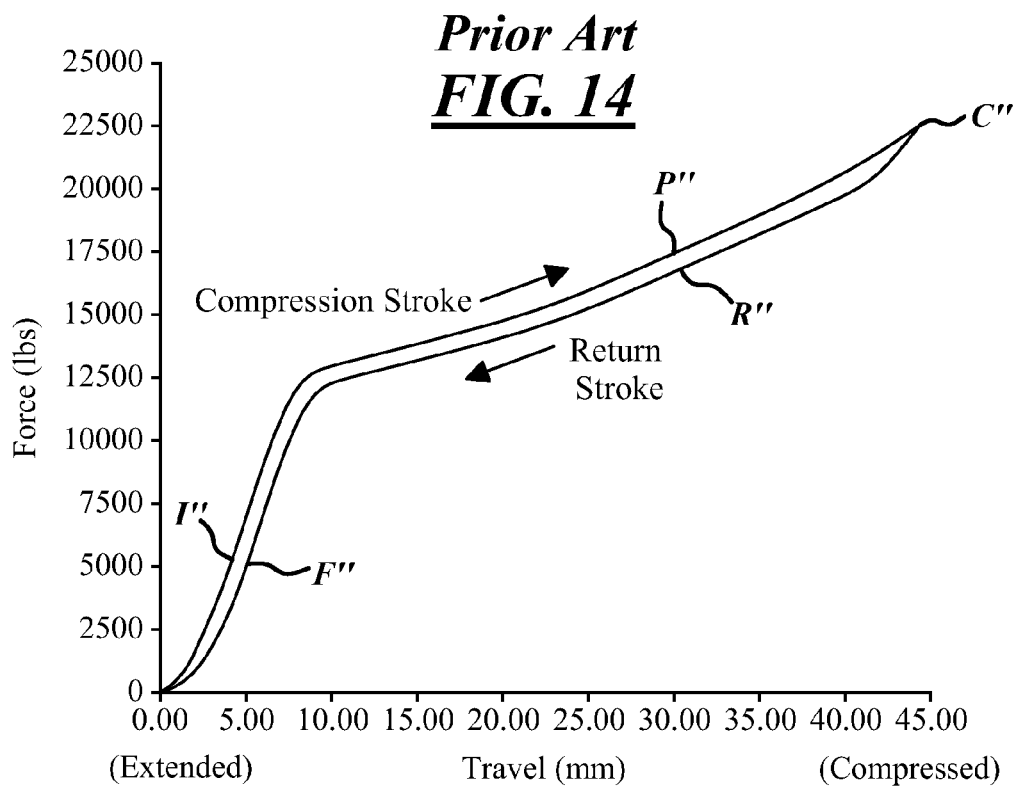
FIG. 15 is a graphical plot of Force as a function of Travel of another prior art piston of another prior art gas spring.

Referring in more detail to the drawings, FIGS. 1, 3, 5, 7, and 9 illustrate an exemplary embodiment of a gas spring 10 that includes a piston 12 at least partially received in a cylinder 14 of the gas spring 10 for reciprocation between an extended position (FIG. 1) and a compressed position (FIG. 5) over a cycle including a compression stroke and a return stroke (FIG. 13). The gas spring 10 may include multiple pressure chambers, and may be a dual-chamber gas spring.

For example, a primary chamber 16 may be defined at least in part between corresponding portions of the cylinder 14 and the piston 12 for receiving a pressurized gas therein to provide an extension or return force of the gas spring 10. During at least a portion of a return or extension stroke of the piston 12, a secondary chamber 18 (FIGS. 3, 7, 9) may be established or defined at least in part between other corresponding portions of the piston 12 and the cylinder 14. The secondary chamber 18 may receive some of the pressurized gas from the primary chamber 16 to reduce or counteract the extension force, as explained in general immediately below and in more detail further herein below.

As the piston 12 strokes from the extended position to the compressed position, and strokes back or returns to the extended position, the primary chamber 16 and the secondary chamber 18 may cooperatively communicate to provide a desired variable pressure differential across the piston 12. As shown in FIG. 13, the pressure differential produces a net force cycle C that starts at a relatively high value, gradually increases over a compression stroke P, thereafter gradually decreases over at least a portion of an extension or return stroke R, before rapidly decreasing over a final portion F of the return stroke R. The rapidly reduced force offered by the gas spring 10 results, at least in part, from compression of gas in the secondary chamber 18, thereby producing a force in opposition to the force of the compressed gas in the primary chamber 16. Pressurized gas may be throttled or allowed to pass from the secondary chamber 18 to the primary chamber 16 during the final portion of the return stroke R. The piston cycle is represented by the plot of force as a function of travel of the piston wherein the plot has a shape approximately as shown in FIG. 13.

Accordingly, the gas spring 10 may be used within a press (not shown) to provide desired operation of, for example, a cam device. In a cam application, full force of a gas spring may be desirable during a compression stroke to effectively cam-form a part, but a sudden stop of the cam at the end of a return stroke at the full force of the gas spring may damage or prematurely wear the cam. Thus, the gas spring 10 may provide its full net force during its compression stroke P and over at least an initial portion of its return stroke R, but provides reduced net force over at least a final portion F of the return stroke R. As such, the gas spring force may be reduced before a returning cam stops to avoid sudden impact at full extension of the gas spring, and this may extend the life of the cam and the gas spring 10.

In one exemplary embodiment, for gas springs having about a 25 mm to 125 mm return stroke, the last about 0.25 mm to about 12.5 mm of the return stroke may be cushioned. More specifically, the last about 1 mm to about 6 mm of the return stroke may be cushioned. In other words, in one example, the last about 1% to about 50% of the return stroke may be cushioned and, more specifically, the last about 0.8% to about 24% may be cushioned. Such cushioning length may provide particularly good regulation of heat produced during the return stroke, and may enable a particularly good rate of operation in terms of strokes per minute. In other embodiments, the cushioned portion of the return stroke may be controlled by the length of the skirt 90 and, thus, it may be possible to provide a greater portion of the return stroke with cushioning, even up to the full length of the return stroke if desired.

The cylinder 14 of the gas spring 10 may include a piston retainer 13 carried in a casing 15. As used herein, the cylinder 14 refers to the portion of the gas spring 10 that generally cooperates with the piston 12, and may include any shape and size and need not be cylindrical in shape. The casing 15 may be a common or standard gas spring casing, for example, to allow retrofit of an existing gas spring to be modified with the novel features described herein.

More specifically, the casing 15 may be a generally cylindrical component as shown, and may have a generally cylindrical wall 20 closed at one end by a cap 22 and substantially open at another end 24 to receive the piston 12 therein. Generally, the cap 22 may be attached and sealed, for example, by a weld joint, or cast or formed as one piece with the cylindrical wall 20. The wall 20 of the casing 15 has an inner surface 26 that may at least partially define the primary chamber 16, and an outer surface 28. The inner surface 26 of the wall 20 may include a generally circumferential retainer groove 30 constructed for receipt of a retaining ring 32, such as a C-style ring, to maintain the gas spring 10 in its assembled state. To facilitate mounting and locating the gas spring 10 within a press, a pair of longitudinally spaced circumferential grooves 34, 36 may be formed in the outer surface 28 of the casing 15 adjacent the opposite ends of the casing 15.

To admit gas into the gas spring 10, the casing 15 may include a fill passage or port 38 extending between the inner and outer surfaces 26, 28 of the wall 20, shown here as extending through the generally closed end cap 22 of the casing 15. A fill valve 40 may be received in the fill port 38 to act as a one way valve to permit pressurized gas to be admitted into the gas spring 10 and, prevent the gas from exiting the gas spring 10 via the fill port 38 and its plug 42.

The piston 12 of the gas spring 10 may include a generally elongate piston rod 44 with one end 46 extending out of the casing 15 and adapted to engage a ram, cam, or the like of a press, and another end 48 received within the casing 15. The piston rod 44 may be a common or standard gas spring piston rod, for example, to allow retrofit of an existing gas spring to be modified with the novel features described herein. The piston rod 44 may include a radially outwardly and circumferentially extending shoulder 50 adjacent the end 48 that may be constructed to receive one or more other components of the piston 12.

Figure 1:
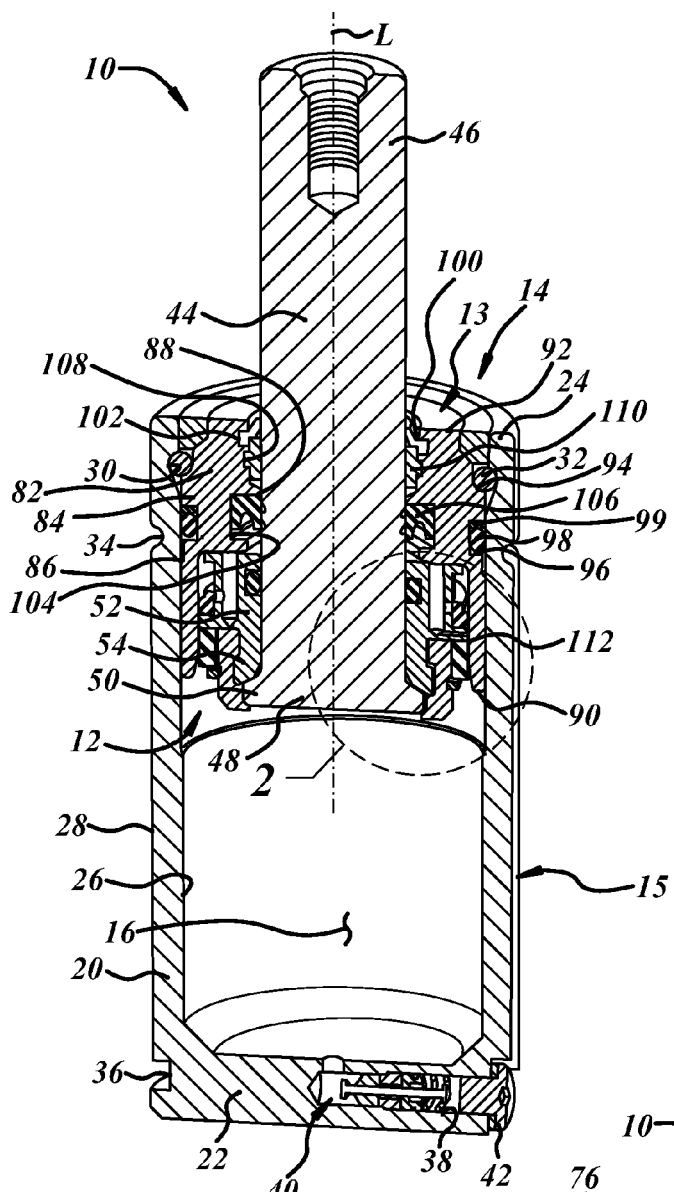
FIG. 1 is a cross-sectional perspective view of an exemplary embodiment of a gas spring with a piston assembly shown in an extended or returned position.
Figure 2:
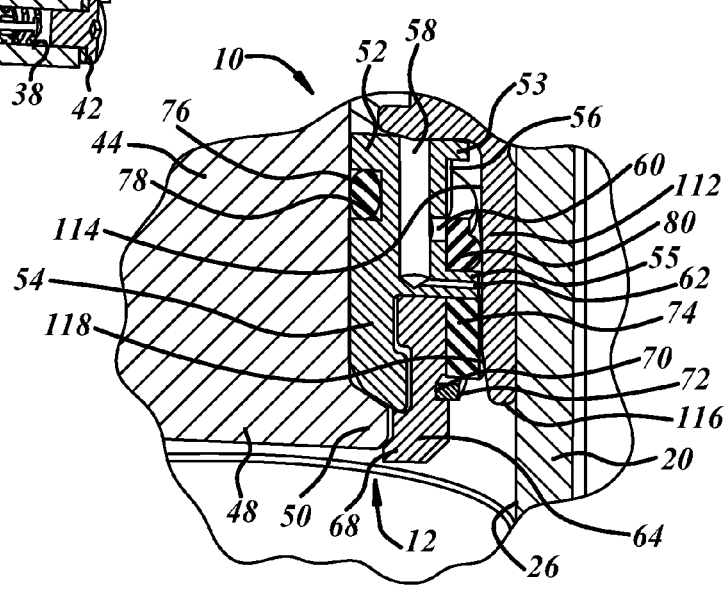
FIG. 2 is an enlarged view of the gas spring of FIG. 1, taken from circle 2 thereof.

For example, and referring to FIGS. 1 and 2, another component of the piston 12 may include a piston collar 52 that may be assembled over the end 46 of the piston rod 44 and positioned against the shoulder 50 of the other end 48 of the piston rod 44. Referring also to FIG. 11, the collar 52 may be generally circumferentially continuous or annular, and may include a flange 54, and generally axially opposed walls 53, 55 between which an annular groove 56 may be defined. The collar 52 may also include one or more transfer passages communicating at one end thereof with the secondary chamber 18 and at an other end thereof with the primary chamber 16. The transfer passages may provide, at least in part, for gas flow between the primary chamber 16 and the secondary chamber 18 during a portion of the piston 12 movement or reciprocation between its extended and compressed positions.

For example, the transfer passages may include one or more passages 58 that may be generally axially disposed in at least one of the walls 53, 55 of the collar 52, one or more bleed ports 60 that may be transversely disposed in a periphery of the collar 52 within the groove 56, and one or more throttling ports 62 that may be transversely disposed in a periphery of the collar 52 in at least one of the walls 53, 55. The ports 60, 62 may be in common fluid communication with the passage(s) 58, or the ports 60, 62 may be in separate fluid communication with the passage(s) 58 in another implementation. Accordingly, an exemplary bleed passage 58/60 and an exemplary throttling passage 58/62 may be defined in the piston 12. As used herein, the term transverse includes any orientation at any non-zero angle with respect to a longitudinal axis L of the piston 14. As also used herein, the term axial includes a direction substantially parallel to the longitudinal axis L of the piston 14.

As shown in FIG. 12, a further component of the piston 12 may include a collar retainer 64, which may be split to include split halves 63, 65 for conjoint movement with the piston rod 44. As also shown in FIG. 12, one or more gaps 66 may be defined between the halves 63, 65. Further, the retainer 64 may include a generally circumferential inwardly extending shoulder 68 constructed to be closely received by the corresponding shoulder 50 at the end 48 of the piston rod 44. Also, the retainer 64 may include a generally circumferential groove 70 in a periphery thereof.

As shown in FIG. 2, the groove 70 may receive a retaining ring 72, such as a snap ring or the like. The ring 72 may radially retain the retainer 64 to the collar 52 and axially retains an annular guide bearing 74 to the retainer 64 and, thus, axially retains the collar 52 to the piston rod 44. The guide bearing 74 may facilitate guiding the piston 12 within the cylinder 14. The bearing 74 may be axially retained between the retaining ring 72 and one of the walls 53, 55 of the collar 52. The guide bearing 74 may be constructed from a composite polymer or metal alloy and sized to slidably engage a portion of the piston retainer 13, or the inner surface 26 of the casing 15 in another implementation, to guide the piston 12 for axial reciprocation within the cylinder 14.

Additionally, the piston 12 may include one or more seals. For example, a piston rod seal 76 may be disposed between the collar 52 and the piston rod 44 such as in a circumferential groove 78 in an inner surface of the collar 52. Also, a seal 80 may be disposed between the piston 12 and the cylinder 14 and, during a portion of its cycle, may separate the primary chamber 16 on one side of the seal 80 from the secondary chamber 18 on another side of the seal 80.

Moreover, the seal 80 may be disposed adjacent the bleed passages 60. More specifically, the seal 80 may be translatable in a generally axial or longitudinal direction across the bleed passages 60; from one axial side of the bleed passages 60 to the other. Further, the movable seal 80 may be carried by the collar 52, for example, between the walls 53, 55 and in the groove 56 of the collar 52.

The seal 80 may be designed and constructed to move without twisting. In one exemplary implementation, the seal 80 may be d-shaped or b-shaped in cross-section as shown. In another exemplary implementation, the seal 80 may be composed of a relatively high durometer polyurethane material. For example, a polyurethane material having a 60 or higher durometer on the Shore D scale may be used to avoid twisting of the seal 80 in the groove 56 and to resist damage while sliding over ports 60.

Although the piston 14 has been exemplified by the piston 12 described above, the piston 14 could be constructed and arranged from more or less parts. One example includes an integrated piston rod and head, or a piston, that may carry the various seals, bearings, and passages described above.

The piston retainer 13 may be at least partially carried by the casing 15 and may include a retainer body 82 that may have a generally cylindrical wall 84 with an outer surface 86 at least partially sized to be closely received adjacent to the inner surface 26 of the casing 15. The wall 84 may have an inner surface 88 defining a through bore in which the piston rod 44 may slidably reciprocate. The retainer body 82 may have generally opposite axial ends 90, 92, with one end 90 being received in the open end 24 of the casing 15 upon assembly of the piston retainer 13 in the casing 15. To facilitate attachment of the retainer body 82 within the casing 15, the retainer body 82 may include a generally circumferential shoulder and/or groove 94 arranged to receive the snap ring 32, which may be also received in the groove 30 of the casing 15. To further facilitate a gas-tight seal between the retainer body 82 and the casing 15, a generally circumferential seal groove 96 may be provided in the outer surface 86 of the retainer body 82 for receipt of a seal 98 and a backup ring 99. The seal 98 may be an O-ring compressed between the seal groove 96 and the inner surface 26 of the casing 15.

The retainer body 82 may include a circumferential wiper groove 100 adjacent its end 92 for maintaining a wiper 102 therein. The wiper 102 may include a lip to engage the piston rod 44 to prevent contamination or debris from entering the gas spring 10 between the retainer body 82 and the piston rod 44. The inner surface 88 of the retainer body 82 may include a generally circumferential seal shoulder and/or groove 104 spaced axially from the wiper groove 100 and adapted to receive a rod seal 106 that sealingly engages the piston rod 44 to prevent gas from within the gas spring 10 from leaking out of the gas spring 10 between the piston rod 44 and the retainer body 82. The retainer body 82 may include one or more generally annular recesses 108 that may be axially spaced between the wiper and seal grooves 100, 104 and generally sized to receive one or more bearings 110, which may be composite polymer journal bearings.

Also, the retainer body 82 may include a skirt portion 112 disposed within the casing 15 and having an inner surface 114 that may be concentrically arranged with the outer surface 88 and adjacent to the end 90. The skirt portion 112 may define an annular pocket in which at least a portion of the piston 12 may be received when the piston 12 is in and adjacent to its fully extended position. The skirt portion 112 may include an axial end surface 116 and a tapered inner surface 118 between the end surface 116 and the inner surface 114. The skirt portion 112 may be configured to cooperate with the bearing 74 and seal 80 of the piston 12. But in other implementations, the inner surface 26 of the casing 15 may be configured to cooperate with the bearing 74 and seal 80 of the piston 12. For example, in gas springs with relatively long strokes it may be more economical to use a stepped diameter cylinder instead of a skirt on a retainer body.

In one exemplary implementation, the primary chamber 16 may be defined at least partially by the casing 15 and the piston 12. More specifically, the chamber 16 may be defined by the walls 20, 22 and by an axially facing surface area of the piston 12 within a diametric extent of the seal 80, when the seal 80 is in contact the retainer body 82 or casing 15. Also, the secondary chamber 18 may be defined at least partially between the piston 12 and the piston retainer 13. More specifically, the chamber 18 may be defined radially between the outer diameter of the piston rod 44 and an inner diameter of the skirt 112. And the chamber 18 may be defined axially between an axially facing surface area of the piston collar 52 and an axially facing surface area of the retainer body 82 and backup ring 99 within a diametric extent of the movable seal 80, when the seal 80 is in contact with the retainer body 82 or casing 15.

The operation of the gas spring 10 will be described with general reference to the operation cycle shown in FIG. 13, and with particular reference to FIGS. 1-10. With the piston 12 received in the cylinder 14, and the retainer body 82 maintained within the casing 15 by the retaining ring 32, the gas spring 10 may be charged with gas through the fill port 38. Accordingly, the gas spring 10 maintains a charge of pressurized gas that yieldably biases the piston 12 and its rod 44 as an assembly to its extended position as shown in FIG. 1.

Typically, a plurality of the charged gas spring 10 may be received in a die assembly with a press ram, cam, or the like (not shown) abutting the end 46 of the extended piston rods 44. As a ram and drive cam are advanced from fully compressed positions, a driven cam may be urged, against the bias force of one or more of the gas springs 10, into engagement with a metal blank to be formed, punched, or the like. The piston rods 44 of the gas springs 10 may be compressed under the ram and cam force as press dies are moved toward closed positions to form the metal blank into a formed part. But the press ram and cams may reach their fully extended position before the piston 12 bottoms out on the closed end 22 of the casing 15, thereby preventing damage to the gas spring 10.

As shown in FIGS. 1 and 2, when the gas spring 10 is in its steady state such that the piston 12 is in its fully extended or returned position, the primary chamber 16 is substantially at its maximum volume and the secondary chamber 18 is substantially at its minimum or zero volume. For example, such a position corresponds to the point of the cycle C at 0 mm of piston rod travel and about 12,000 pounds force in FIG. 13. The movable seal 80 is in its first position on one side of, or overlapping or blocking, the bleed port 60. More specifically, the seal 80 may be seated against one wall 55 of the collar 52 in the collar groove 56, and the seal 80 may be in sealing engagement with the skirt 112 of the retainer body 82. The seal 80 separates the primary and secondary chambers 16, 18.

Figure 3:
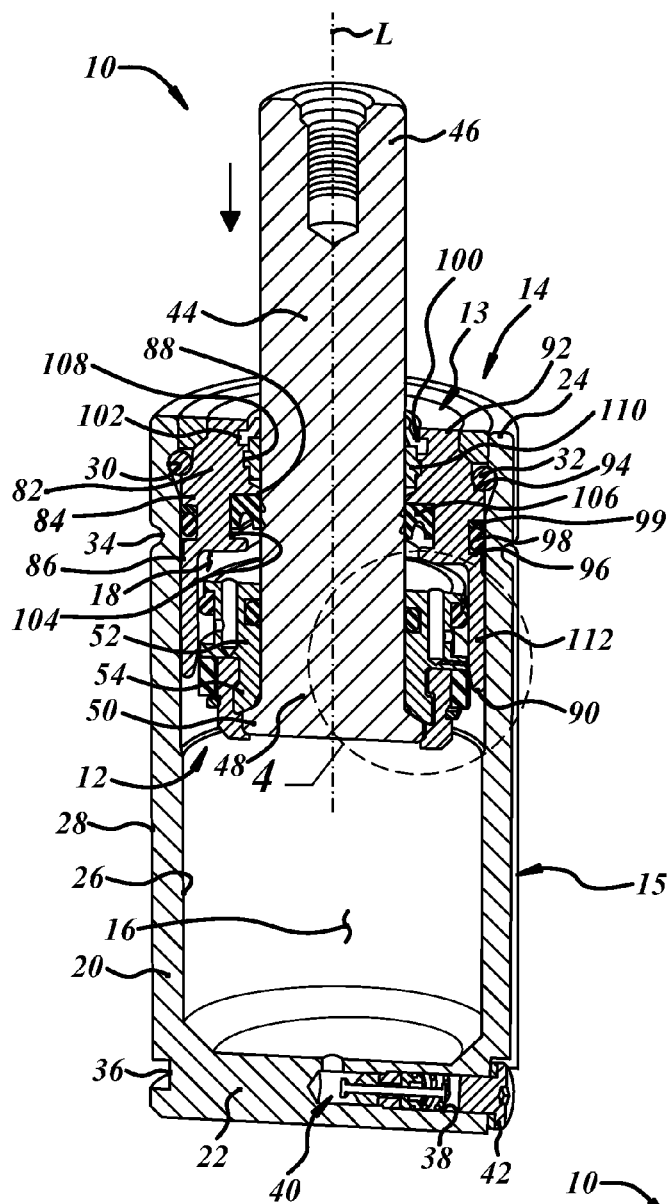
FIG. 3 is a view similar to FIG. 1 showing the piston moved from its extended position toward a compressed position.
Figure 4:
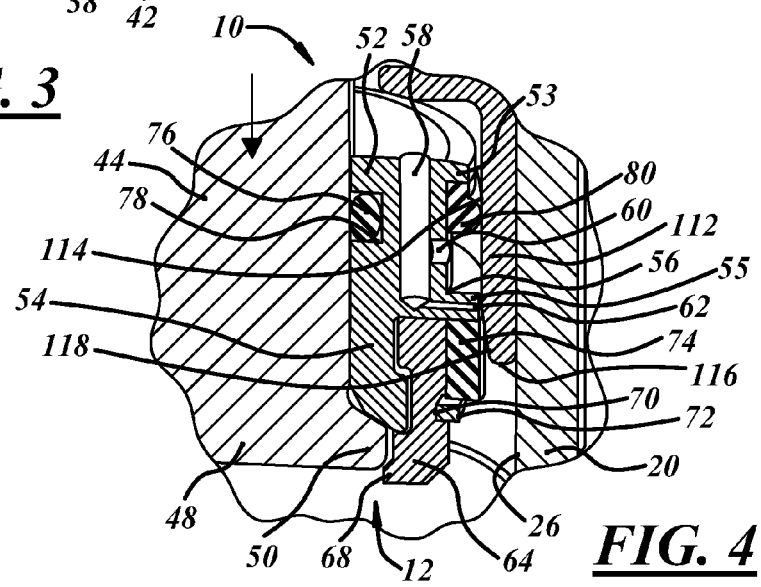
FIG. 4 is an enlarged view of the gas spring of FIG. 1, taken from circle 4 of FIG. 3.

As shown in FIGS. 3 and 4, the piston 12 is being moved downwardly according to a compression stroke of the gas spring 10. Such a position may correspond to the compression stroke P of the cycle C in FIG. 13, for example, at about 20 mm of piston rod travel. As the piston rod 44 and collar 52 are displaced, there is relative motion between the movable seal 80 and the collar 52 such that the seal 80 at least partially passes over the bleed port 60 of the collar 52 in a first direction. As such, the seal 80 is constructed and arranged to be relatively traversable over at least a portion of one or more transfer passages such as the bleed port 60.

In a specific example, the seal 80 may pass over the bleed port 60 and seat against one wall 53 of the collar 52 in the collar groove, while the seal 80 is still in sealing engagement with the skirt 112 of the retainer body 82. At this point, the pressure chambers 16, 18 are still separated by the seal 80, but there may be fluid communication by way of the passages 58, 60, 62. More specifically, pressurized gas may flow from the primary chamber 16 to the secondary chamber 18, as the pressure in the chamber 16 increases due to movement of the piston 12 further into the pressure chamber 16. This tends to maintain the pressure the same in each pressure chamber 16, 18. Accordingly, the bleed ports 60 may be sized and provided in such a quantity to freely permit fluid flow between the pressure chambers 16, 18. In any case, the seal 80 moves along the skirt portion 112 of the retainer body 82 and disengages from the tapered inner surface 118, when the piston 12 is moved sufficiently into the pressure chamber 16.

Figure 5:
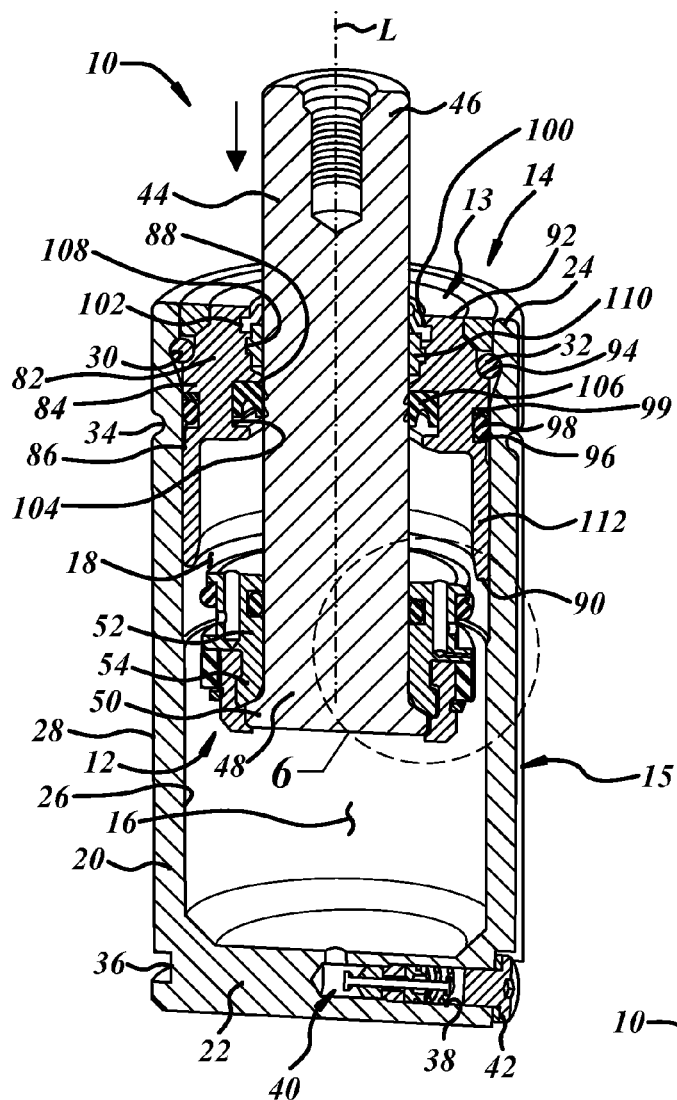
FIG. 5 is a view similar to FIG. 1 showing the piston moved further toward its compressed position.
Figure 6:
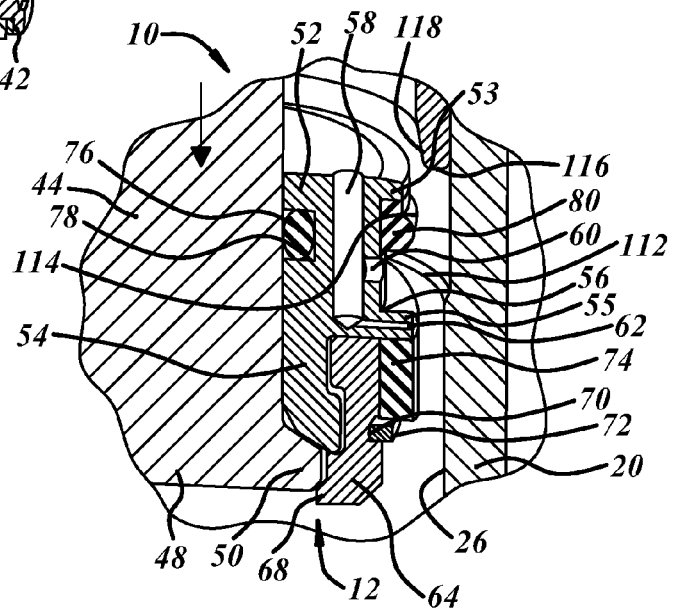
FIG. 6 is an enlarged view of the gas spring of FIG. 1, taken from circle 6 of FIG. 5.

More specifically, as shown in FIGS. 5 and 6, the piston 12 continues its downward movement during the compression stroke such that the pressure chambers 16, 18 are fully in communication with one another. In other words, the pressure chambers 16, 18 achieve fluid communication around portions of the piston 12, rather than through the passages 58, 60, 62. Accordingly, a single pressure chamber is effectively established in the gas spring 10. For example, such a position corresponds to the peak of the cycle C in FIG. 13 at about 42 mm of piston rod travel.

Figure 7:
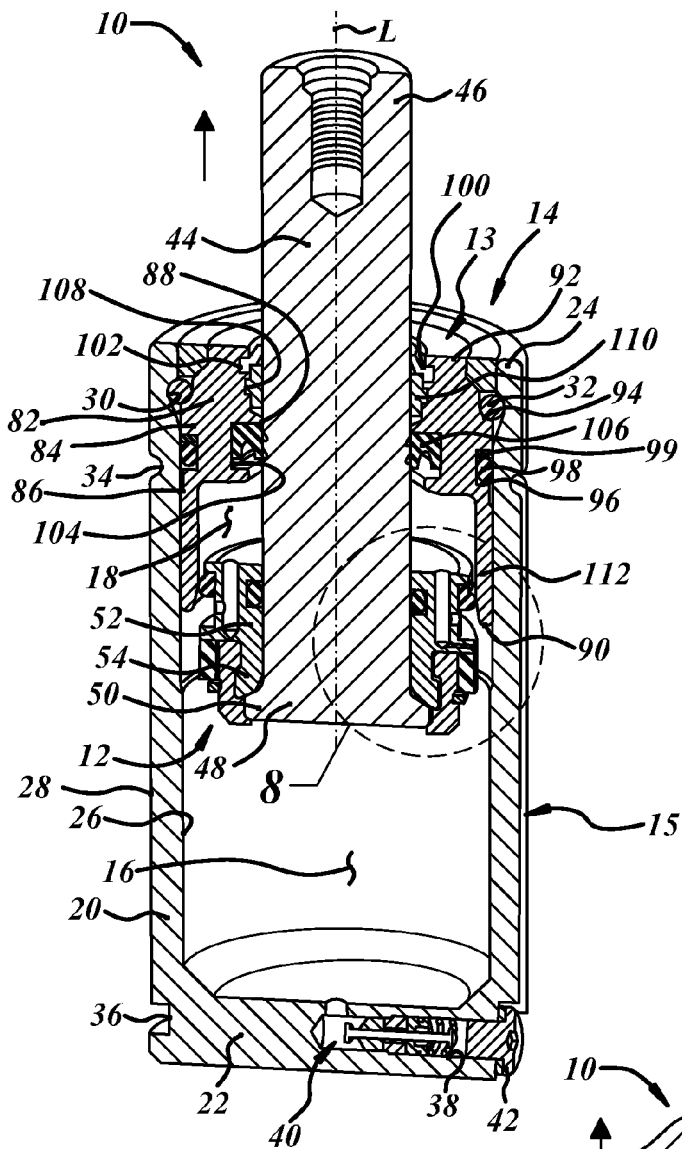
FIG. 7 is a view similar to FIG. 1 showing the piston moving back toward its extended or returned position in a first intermediate return position and showing a second pressure chamber in addition to the first pressure chamber.
Figure 8:
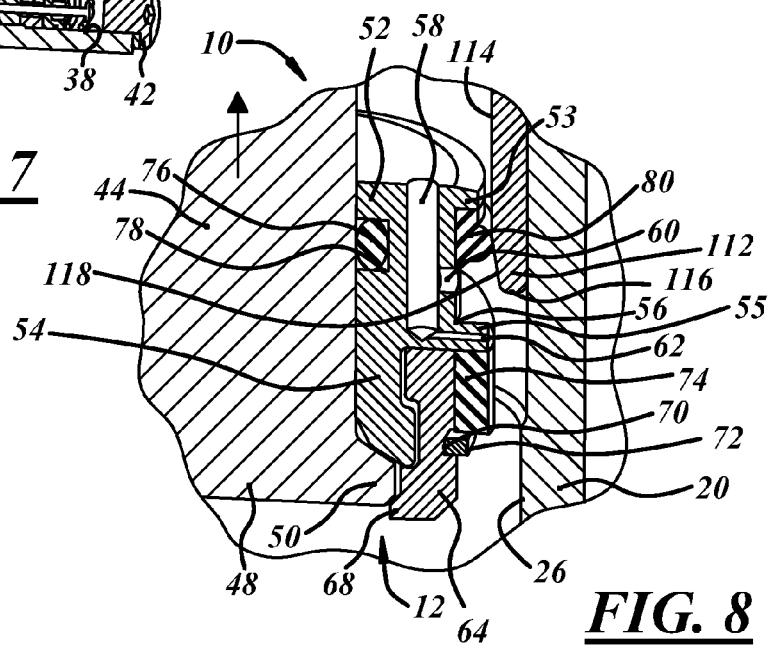
FIG. 8 is an enlarged view of the gas spring of FIG. 1, taken from circle 8 of FIG. 7.

After the compression stroke, and with reference to FIGS. 7 and 8, as the press ram is retracted, the piston 12 moves toward its extended position due to a return force of the pressurized gas acting on the end 48 of the piston 12. Such a position may correspond to the return stroke R of the cycle C in FIG. 13, for example, from 25 mm to 20 mm of piston rod travel. The seal 80 may initially contact or re-engage the tapered inner surface 118 of the skirt 112 of the retainer body 82. As a result, the secondary chambers 16, 18 begin to distinguish themselves, wherein the pressure chamber 18 is generally separate from the primary chamber 16.

As the piston 12 returns, gas in the now-defined secondary chamber 18 is compressed by the surface area of the collar 52 between the seals 76, 80. When the bleed ports 58/60 are open, this compressed gas in the chamber 18 may freely flow through the bleed ports 58, 60 so that gas pressure in the secondary chamber 18 may at least begin to equalize with the gas pressure in the primary chamber 16.

Figure 9:
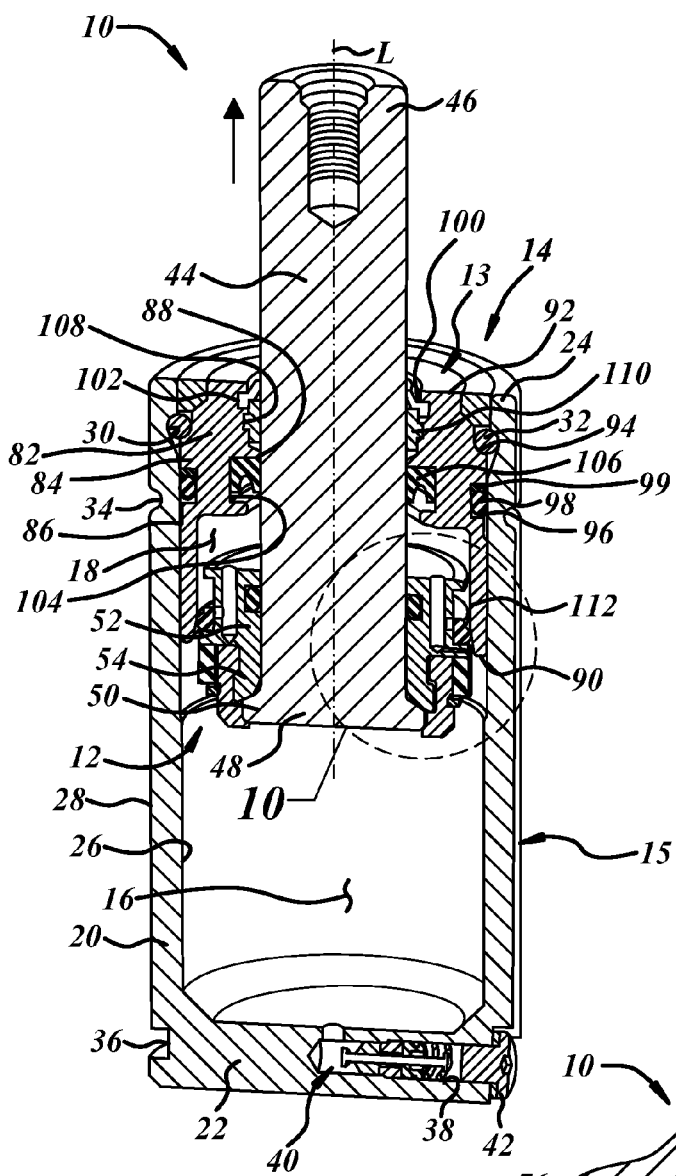
FIG. 9 is a view similar to FIG. 1 with the piston further returned toward its extended position in a second intermediate return position and showing the first and second pressure chambers.
Figure 10:
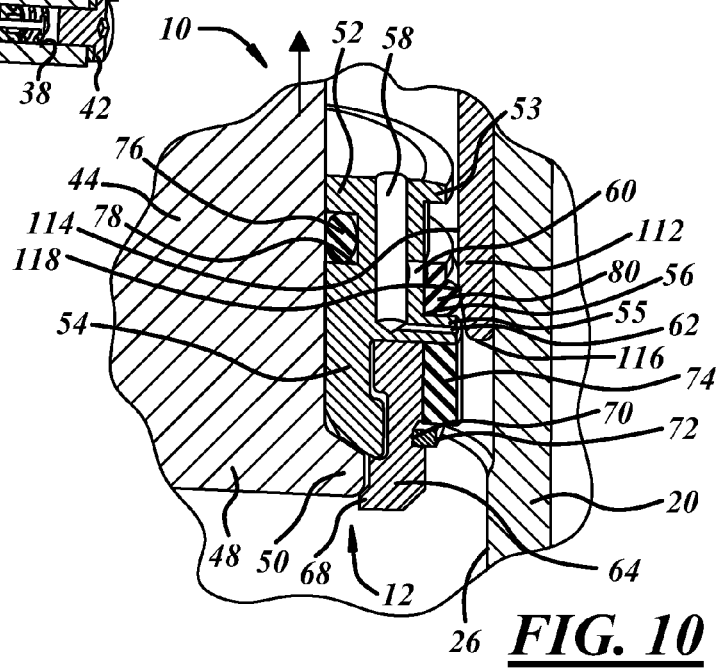
FIG. 10 is an enlarged view of the gas spring of FIG. 1, taken from circle 10 of FIG. 9.

As shown in FIGS. 9 and 10, the piston 12 has moved further toward its extended position. As shown, the seal 80 is still in contact with and is compressed by the tapered inner surface 118 of the skirt 112 of the retainer body 82, despite the movement of the piston 12. In other words, as the piston rod 44 and collar 52 are displaced, there is relative motion between the movable seal 80 and the collar 52 such that the seal 80 passes back over the bleed port 60 of the collar 52 in a second direction.

The seal 80 is relatively movable between an open position permitting free flow of gas through the transfer passage(s) to a closed position at least partially restricting gas flow through the transfer passage(s). Restriction or closing of the bleed ports 58/60 permits gas in the secondary chamber 18 to be compressed in response to movement of the piston 12 toward its extended position. This increased pressure produces a force acting on one side of the piston 12 from the secondary chamber 18 that opposes the force acting on the other side of the piston 12 from the primary chamber 16. This results in a decrease in a differential force across the piston or, stated another way, a reduction in net force offered by the piston 12. This reduction is exemplified by a final portion F of the return stroke R of the cycle C in FIG. 13 from about 10 mm of piston rod travel to about 3 mm of piston rod travel. Also, the return of the piston 12 is delayed such that the velocity of the returning piston 12 is decreased.

In a specific example, the seal 80 may pass over the bleed port 60 and seat against one wall 55 of the collar 52 in the collar groove, while the seal 80 is still in sealing engagement with the skirt 112 of the retainer body 82. As a result, the bleed ports 58/60 become closed such that gas no longer flows unrestricted through the bleed passage 58/60 and, instead, gas flows only through the throttling passage 58/62. The throttling of the gas allows the forces acting on either side of the piston 12 to approach equilibrium.

Also, the return velocity of the piston 12 decreases according to the volume of gas allowed to flow through the throttling passage 58, 62. The return velocity of the piston 12 ceases to be a function of pressure in the primary chamber 16 and the velocity becomes a function of the varying differential in pressure between the primary and secondary chambers 16, 18. This pressure differential between the chambers 16, 18 will vary as a function of the rate of flow of pressurized gas through the throttling passage 58/62 and movement of the piston 12. During this particular portion of the cycle, the velocity of the returning piston 12 becomes less than the velocity of the press ram, which was driving the gas spring 10. As long as the velocity of the returning press ram is greater than that of the returning piston 12, the net force of the piston 12 on the press ram will be zero.

The size and quantity of the throttling port(s) 62 and/or passage(s) 58/62 may be determined in any suitable manner to reduce impact energy to the cam or other portions of the press. The bleed ports 60 may be sized to allow the gas to freely flow at a desired velocity of the particular application (i.e. desired velocity of the cam, press, and/or gas spring), whereas the throttling port(s) 62 may be sized to reduce the return velocity of the rod 44 to reduce the impact energy to the cam or other press portion. In any event, the total cross-sectional area (flow area) of the throttling port(s) 62 may be less than the total cross-sectional area of the bleed ports 60. For example, the total cross-sectional area of the throttling port(s) 62 may be about 0.5% to about 5% of the total cross-sectional area of the bleed ports 60 and, more specifically, may be about 1% to about 2% of the total cross-sectional area of the bleed ports 60.

Ultimately, although the gas pressure within the pressure chambers 16, 18 may equalize, the piston 12 will be biased to its fully extended position because the gas in the primary chamber 16 acts on a greater surface area of the piston 12 than does the gas in the secondary chamber 18. As a result of the varying differential force acting on the piston 12 as it travels over the final portion of its return stroke, press ram or cam motion will be independent of or may encounter only a small resistive force from the gas spring 10. The reduced or low impact force upon return of the press ram or cam may reduce wear, damage, noise and vibration of a cam or other forming tool as well as other portions of the press.

It should be recognized that one of ordinary skill in the art will devise modifications, variations and other embodiments encompassed within the scope of this invention. The embodiments described above are intended to be illustrative and not limiting. The scope of the invention is defined by the claims that follow.

I claim:

1. A delay return gas spring, comprising:
a cylinder;
a piston at least partially received in the cylinder for reciprocation between extended and compressed positions over a cycle including a compression stroke and a return stroke, wherein the piston comprises:
  a piston rod having an end extending out of the cylinder, and a radially outwardly extending shoulder at an other end within the cylinder;
  a collar positioned directly against the radially outwardly extending shoulder of the piston rod at the other end of the piston rod;
  a collar retainer carried by the piston rod to retain the collar on the piston rod; and
  a retaining ring carried by the collar retainer to radially retain the collar retainer to the collar and thereby retain the collar to the piston rod;
a seal disposed between the cylinder and the piston and, during a portion of the cycle, separating a primary chamber defined by the cylinder and the piston on one side of the seal from a secondary chamber defined by the cylinder and the piston on another side of the seal; and
at least one passage communicating at one end with the secondary chamber and at an other end with the primary chamber;
wherein the seal is relatively movable between an open position permitting free flow of gas through the at least one passage to a closed position at least partially restricting gas flow through the at least one passage so as to permit gas in the secondary chamber to be compressed in response to movement of the piston toward its extended position, thereby reducing a net return force on the piston and decreasing a velocity of the piston.

2. The gas spring of claim 1 wherein the at least one passage includes at least one bleed port and at least one throttling port.

3. The gas spring of claim 2 wherein the cylinder includes a casing having an inner surface defining at least part of the primary chamber, and a piston retainer received at least partly in the casing and having a through bore and also having an outer surface with a portion disposed generally adjacent to the inner surface of the casing.

4. The gas spring of claim 3 wherein the piston rod is at least partially disposed in the through bore of the piston retainer for reciprocation between the extended and compressed positions, and wherein at least part of the secondary chamber is defined between the piston and the piston retainer during at least a portion of the reciprocation of the piston, and wherein the piston collar carries the at least one bleed port and the seal.

5. The gas spring of claim 4 wherein the collar also carries the at least one throttling port.

6. The gas spring of claim 2 wherein the seal is moved to the closed position over the last about 0.2% to about 50% of the return stroke of the piston.

7. The gas spring of claim 6 wherein a total cross-sectional area of the throttling port is less than a total cross-sectional area of the bleed port.

8. The gas spring of claim 7 wherein the total cross-sectional area of the throttling port is about 0.5% to about 5% of the total cross-sectional area of the bleed port.

9. The gas spring of claim 8 wherein the total cross-sectional area of the throttling port is about 1% to about 2% of the total cross-sectional area of the bleed port.

10. The gas spring of claim 1 wherein the piston further comprises:
an annular guide bearing axially carried between the retaining ring and the collar and radially between the collar retainer and the cylinder to facilitate guiding the piston within the cylinder during at least a portion of the reciprocation of the piston.

11. The gas spring of claim 10 wherein the piston further comprises a piston rod seal disposed between the collar and the piston rod, wherein the primary chamber is defined by the casing, the piston, and the seal when the seal is in contact with the cylinder, and wherein the secondary chamber is defined by the piston and the piston retainer between the piston rod seal and the seal when the seal is in contact with the cylinder.

12. The gas spring of claim 11 wherein the piston retainer includes a retainer body having an axially depending skirt within which the piston is at least partially disposed in its extended position and having an inner surface for cooperation with the seal.

13. The gas spring of claim 12 wherein the axially depending skirt includes a tapered inner surface for disengagement and initial re-engagement with the seal.

14. The gas spring of claim 10 wherein the collar includes a groove defined between radially extending axial walls, the bleed port is open to the groove, and the seal is received in the groove to pass over the bleed port.

15. The gas spring of claim 2 wherein the seal prevents gas flow through the at least one bleed port when the piston is in its extended position and the seal is disposed in contact with the cylinder.

16. The gas spring of claim 15 wherein the seal passes over the at least one bleed port in a first direction during a portion of a compression stroke of the piston while the seal is still in contact with the cylinder.

17. The gas spring of claim 16 wherein the seal disengages from the cylinder during the compression stroke of the piston, wherein the primary and secondary chambers achieve communication around portions of the piston.

18. The gas spring of claim 17 wherein the seal re-engages the cylinder during a return stroke of the piston, at which point the primary and secondary chambers are in communication only through the at least one throttling port and the at least one bleed port.

19. The gas spring of claim 18 wherein the movable seal passes over the at least one bleed port in a second direction during the return stroke of the piston while the seal is still in contact with the cylinder, such that the primary and secondary chambers are in communication through the at least one throttling port.

20. The gas spring of claim 19 wherein the at least one throttling port is in communication between the primary and secondary chambers over the last about 0.2% to about 50% of the return stroke.

21. The gas spring of claim 20 wherein the at least one throttling port is in communication between the primary and secondary chambers over the last about 0.8% to about 24% of the return stroke.

22. The gas spring of claim 15 wherein a total cross-sectional area of the at least one throttling port is less than a total cross-sectional area of the at least one bleed port.

23. The gas spring of claim 22 wherein the total cross-sectional area of the at least one throttling port is about 0.5% to about 5% of the total cross-sectional area of the at least one bleed port.

24. The gas spring of claim 23 wherein the total cross-sectional area of the at least one throttling port is about 1% to about 2% of the total cross-sectional area of the at least one bleed port.

25. The gas spring of claim 1 wherein the seal has a 60 or higher durometer on the Shore D scale.

26. The gas spring of claim 25 wherein the seal includes a polyurethane material.

27. The gas spring of claim 2 wherein when the piston reciprocates between the extended and the compressed positions over a cycle including a compression stroke and a return stroke, such cycle is represented by a plot of force as a function of travel of the piston wherein the plot has a shape as shown in FIG. 13.

28. A gas spring, comprising:
a cylinder; and
a piston at least partially received in the cylinder for reciprocation between extended and compressed positions over a cycle including a compression stroke and a return stroke, wherein the piston comprises:
 a piston rod having an end extending out of the cylinder, and a radially outwardly extending shoulder at an other end within the cylinder;
 a collar positioned directly against the radially outwardly extending shoulder of the piston rod at the other end of the piston rod;
 a collar retainer carried by the piston rod to radially retain the collar on the piston rod; and
 a retaining ring carried by the collar retainer to retain the collar retainer to the collar and thereby retain the collar to the piston rod.

29. The gas spring of claim 28 wherein the collar retainer includes an inwardly extending shoulder received by the outwardly extending shoulder of the piston rod.

30. The gas spring of claim 29 wherein the collar includes a circumferential groove to receive the collar retainer, which includes halves with gaps defined between the halves.

31. The gas spring of claim 28 comprising:
a seal disposed between the cylinder and the piston and, during a portion of the cycle, separating a primary chamber defined by the cylinder and the piston on one side of the seal from a secondary chamber defined by the cylinder and the piston on another side of the seal; and
at least one passage communicating at one end with the secondary chamber and at an other end with the primary chamber;
wherein the seal is relatively movable between an open position permitting free flow of gas through the at least one passage to a closed position at least partially restricting gas flow through the at least one passage so as to permit gas in the secondary chamber to be compressed in response to movement of the piston toward its extended position, thereby reducing a net return force on the piston and decreasing a velocity of the piston;
wherein the seal is at least one of d-shaped or b-shaped in cross-section and is carried by the piston and axially movable relative to the piston without substantial twisting of the seal.

32. The gas spring of claim 31 wherein the seal has a 60 or higher durometer on the Shore D scale.

33. The gas spring of claim 32 wherein the seal includes a polyurethane material.

34. The gas spring of claim 28 comprising:
the cylinder having a casing having an inner surface;
a piston retainer received at least partly in the casing and including a retainer body having a through bore, an outer surface with a portion disposed generally adjacent to the inner surface of the casing, and a skirt portion;
the piston rod received at least partially in the through bore of the retainer body of the piston retainer;
the collar received at least partially within the skirt portion of the retainer body of the piston retainer during at least a portion of the reciprocation of the piston, and the collar including radially extending axial walls, a groove between the axial walls, a common passage, a throttling port in fluid communication with the common passage, and a bleed port in fluid communication with the common passage;

a piston rod seal disposed between the piston rod and the collar; and a movable seal disposed in the groove of the collar and constructed and arranged for contact with the skirt portion of the retainer body of the piston retainer during at least a portion of the reciprocation of the piston and the movable seal includes a material having a 60 or higher durometer on the Shore D scale;

wherein a primary chamber is defined by the casing and a portion of the piston on one side of the movable seal when the movable seal is in contact with the cylinder, and a secondary chamber is defined by another portion of the piston and the piston retainer between the piston rod seal and the movable seal when the movable seal is in contact with the cylinder;

and wherein the movable seal is constructed and arranged to be in a closed position over the bleed port to prevent gas flow through the bleed port between the primary and secondary chambers, or in an open position away from the bleed port to permit gas flow through the bleed port between the primary and secondary chambers.

35. The gas spring of claim 34 wherein the movable seal prevents as flow through the bleed port between the secondary and primary chambers when the piston is in its extended position and the movable seal is disposed in contact with the cylinder.

36. The gas spring of claim 35 wherein the movable seal passes over the bleed port in a first direction during a portion of a compression stroke of the piston while the movable seal is still in contact with the cylinder, and the movable seal disengages from the cylinder during the compression stroke of the piston, wherein the secondary and primary chambers achieve fluid communication around a portion of the piston.

37. The gas spring of claim 35 wherein the movable seal re-engages the cylinder during a return stroke of the piston, at which point the secondary and primary chambers are in fluid communication only through the throttling and bleed ports, and the movable seal passes over the bleed port in a second direction during the return stroke of the piston while the movable seal is still in contact with the cylinder, such that the secondary and primary chambers are in fluid communication through the throttling port.

38. The gas spring of claim 37 wherein throttling port is in fluid communication between the primary and secondary chambers over the last about 0.2% to about 50% of the return stroke.

39. The gas spring of claim 38 wherein the throttling port is in fluid communication between the primary and secondary chambers over the last about 0.8% to about 24% of the return stroke.

40. The gas spring of claim 34 wherein a total cross-sectional area of the throttling port is less than a total cross-sectional area of the bleed port.

41. The gas spring of claim 40 wherein the total cross-sectional area of the throttling port is about 0.5% to about 5% of the total cross-sectional area of the bleed port.

42. The gas spring of claim 41 wherein the total cross-sectional area of the throttling port is about 1% to about 2% of the total cross-sectional area of the bleed port.

43. The gas spring of claim 34 wherein the movable seal has at least one of a d-shape or a b-shape in cross-section and is axially movable relative to the collar.

* * * * *

UNITED STATES PATENT AND TRADEMARK OFFICE
CERTIFICATE OF CORRECTION

PATENT NO. : 8,490,763 B2
APPLICATION NO. : 12/401369
DATED : July 23, 2013
INVENTOR(S) : Jason L. Vandine Page 1 of 1

It is certified that error appears in the above-identified patent and that said Letters Patent is hereby corrected as shown below:

In the Claims:

Column 11, Line 36, delete "movable".

Column 14, Line 3, change "claim 35" to -- claim 36 --.

Signed and Sealed this
Seventeenth Day of September, 2013

Teresa Stanek Rea
*Deputy Director of the United States Patent and Trademark Office*